US011155226B2

(12) United States Patent
Herbert et al.

(10) Patent No.: US 11,155,226 B2
(45) Date of Patent: Oct. 26, 2021

(54) VEHICLE CABIN MONITORING SYSTEM (71) Applicant: VEONEER US, INC., Southfield, MI (US)

(72) Inventors: Thomas Herbert, Fenton, MI (US); Frank Judge, South Lyon, MI (US); Paul Karolak, Brigton, MI (US); Christof Buettner, Dachau (DE)

(73) Assignee: VEONEER US, INC., Southfield, MI (US)

( * ) Notice: Subject to any disclaimer, the term of this patent is extended or adjusted under 35 U.S.C. 154(b) by 130 days.

(21) Appl. No.: 15/999,128

(22) Filed: Aug. 17, 2018

(65) Prior Publication Data
US 2020/0055480 A1 Feb. 20, 2020

(51) Int. Cl.
*B60R 21/015* (2006.01)
*B60N 2/00* (2006.01)
*G06K 9/00* (2006.01)

(52) U.S. Cl.
CPC ........ *B60R 21/01538* (2014.10); *B60N 2/002* (2013.01); *B60R 21/01544* (2014.10); *G06K 9/00362* (2013.01); *G06K 9/00832* (2013.01); *G06T 2207/30268* (2013.01)

(58) Field of Classification Search
CPC ........ B60R 21/01538; B60R 21/01544; B60N 2/002; G06K 9/00362; G06K 9/00832; G06T 2207/30268
See application file for complete search history.

(56) References Cited

U.S. PATENT DOCUMENTS

| 9,881,349 | B1 * | 1/2018 | Meier .................. G06T 1/0014 |
| 10,339,401 | B2 | 7/2019 | Kuehnle et al. |
| 10,607,370 | B1 * | 3/2020 | El Dokor ............. G06T 7/0004 |
| 2005/0263992 | A1 | 12/2005 | Matsuda |

(Continued)

FOREIGN PATENT DOCUMENTS

| EP | 1106449 A1 | 6/2001 |
| FR | 2808754 A1 | 11/2001 |

(Continued)

OTHER PUBLICATIONS

International Search Report for International Application No. PCT/US2019/046760, dated Nov. 15, 2019, 2 pgs.

*Primary Examiner* — Fadey S. Jabr
*Assistant Examiner* — Naeem Taslim Alam
(74) *Attorney, Agent, or Firm* — Dickinson Wright PLLC (57) ABSTRACT

A system and method for calibrating a vision system includes a selective wavelength interactive material located within the cabin of the vehicle and a control system in communication with the camera. The material is arranged as a pattern having pattern elements configured to reflect or absorb infrared light from an infrared light source. The control system is configured compare a captured image from the vision system that shows the pattern elements and calibrate the vision system based on a comparison of the captured image. Additionally or alternatively, the selective wavelength interactive material is disposed on a surface of a safety belt and the control system is configured to determine that an occupant seated in a seat is wearing a safety belt associated with the seat when the captured images show that the selective wavelength interactive material on the surface of the safety belt extending across the occupant seated.

25 Claims, 5 Drawing Sheets

(56) References Cited

U.S. PATENT DOCUMENTS

| | | | |
|---|---|---|---|
| 2007/0195990 A1* | 8/2007 | Levy | G06K 9/2063 |
| | | | 382/100 |
| 2009/0011718 A1 | 1/2009 | Chun et al. | |
| 2009/0033926 A1 | 2/2009 | Haug | |
| 2010/0182425 A1 | 7/2010 | Sakakida et al. | |
| 2013/0002860 A1* | 1/2013 | Yamaguchi | G01S 17/48 |
| | | | 348/135 |
| 2015/0002638 A1 | 1/2015 | Suzuki et al. | |
| 2015/0296135 A1 | 10/2015 | Wacquant et al. | |
| 2017/0026560 A1 | 1/2017 | Whitehouse et al. | |
| 2017/0280135 A1 | 9/2017 | Shroff et al. | |
| 2018/0211123 A1* | 7/2018 | Yasuda | G06K 9/2027 |
| 2018/0326944 A1* | 11/2018 | Cech | B60R 22/48 |
| 2019/0087977 A1* | 3/2019 | Kim | G06T 7/80 |

FOREIGN PATENT DOCUMENTS

| | | |
|---|---|---|
| GB | 2413992 A | 11/2006 |
| JP | 09323619 A | 12/1987 |
| JP | 2003-118534 A | 4/2003 |
| WO | WO2012160251 A2 | 11/2012 |
| WO | WO 2015/115770 A1 | 8/2015 |

\* cited by examiner

VEHICLE CABIN MONITORING SYSTEM

BACKGROUND

1. Field of the Invention

The present invention generally relates systems and methods for calibrating a vision system, such as an infrared camera and/or detecting proper utilization of a safety belt by the vision system.

2. Description of Related Art

Cameras and other image detection devices have been utilized to detect one or more objects. Control systems that are in communication with these cameras can receive images captured by the cameras and process these images. The processing of these images can include detecting one or more objects found in the captured images. Based on these detected objects, the control system may perform some type of action in response to these detected variables.

However, in order for these objects in the captured images to be properly detected and processed, the cameras must be calibrated properly. This calibration may involve precise placement of the cameras so as to capture an appropriate field of view. In addition, the precise placement of the cameras allows the control system to determine the location of any objects detected in the captured images. Moreover, the control system relies on the precise placement of the camera as a known location. Because the camera location is known, the control system can utilize this known location of the camera to determine the location of the objects found in the captured images of the camera.

Generally, the calibration and precise placement of the cameras are done at the point of manufacture. However, when cameras are utilized in more challenging environments, such as in a vehicle, the impact of the environment on the vehicle may cause the camera to move from its precisely placed position. This movement causes the camera to lose its precise calibration, impacting the control system's ability to detect objects and determine the location of these objects.

These objects may include detecting a person and a safety belt system. The control system may be configured to detect the person and the safety belt and make appropriate conclusions based on the detection of these objects. If the camera is not calibrated properly, the control system may make improper conclusions regarding the detection of the person and the safety belt.

SUMMARY

In one example, a system and method for calibrating a vision system, such as an infrared camera, includes a vision system mounted to a vehicle, a selective wavelength interactive material located within the cabin of the vehicle, and a control system in communication with the infrared camera. The vision system is configured so as to have a field of view of at least a portion of a cabin of the vehicle and to capture one or more images of the field of view of at least the portion of the cabin of the vehicle.

The selective wavelength interactive material are configured to reflect or absorb infrared light from an infrared light source. The selective wavelength interactive material may be shaped as a pattern having pattern elements. The pattern elements are dimensionally located from one another in a known arrangement.

The control system is configured to receive the one or more images which show the reflective or absorbing portions of the pattern having pattern elements. The control system is further configured to compare a captured arrangement of the pattern having pattern elements from the one or more images to the known arrangement and calibrate the vision system based on the comparison of the captured arrangement to the known arrangement.

In another example, a system and method for determining when an occupant seated in a seat is wearing a safety belt associated with the seat includes a vision system, which may include one or more infrared cameras, mounted and configured to have a field of view of the occupant seated in the seat, a selective wavelength interactive material disposed on a surface of the safety belt, and a control system in communication with the vision system. The vision system is configured to capture one or more images of the field of view of the occupant seated in the seat. The selective wavelength interactive material is configured to reflect or absorb infrared light from an infrared light source.

The control system is configured to receive the one or more images which show the reflective or absorbing portions of the selective wavelength interactive material on the surface of the safety belt. The control system may be further configured to determine that the occupant seated in the seat is wearing a safety belt associated with the seat when the one or more images show portions of the selective wavelength interactive material on the surface of the safety belt extending across the body of the occupant seated in the seat.

Further objects, features, and advantages of this invention will become readily apparent to persons skilled in the art after a review of the following description, with reference to the drawings and claims that are appended to and form a part of this specification.

DETAILED DESCRIPTION

Figure 1:
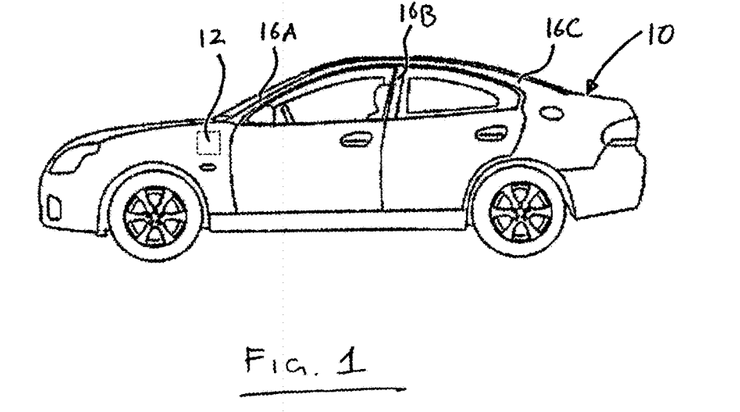
FIG. 1 illustrates a vehicle having a system for calibrating a vision system and/or detecting objects.

Referring to FIG. 1, illustrated is a vehicle 10 having a system 12 for calibrating a vision system and/or detecting objects. In this example, the system 12 has been incorporated within the vehicle 10. However, it should be understood that the system 12 could be a standalone system separate from the vehicle 10.

As to the vehicle 10, the vehicle 10 is shown in FIG. 1 as a sedan type automobile. However, it should be understood that the vehicle 10 may be any type of vehicle capable of transporting persons or goods from one location to another. As such, the vehicle 10 could, in addition to being a sedan type automobile, could be a light truck, heavy-duty truck, tractor-trailer, tractor, mining vehicle, and the like. Also, it should be understood that the vehicle 10 is not limited to wheeled vehicles but could also include non-wheeled vehicles, such as aircraft and watercraft. Again, the term vehicle should be broadly understood to include any type of vehicle capable of transporting persons or goods from one location to another and it should not be limited to the specifically enumerated examples above.

Figure 2:
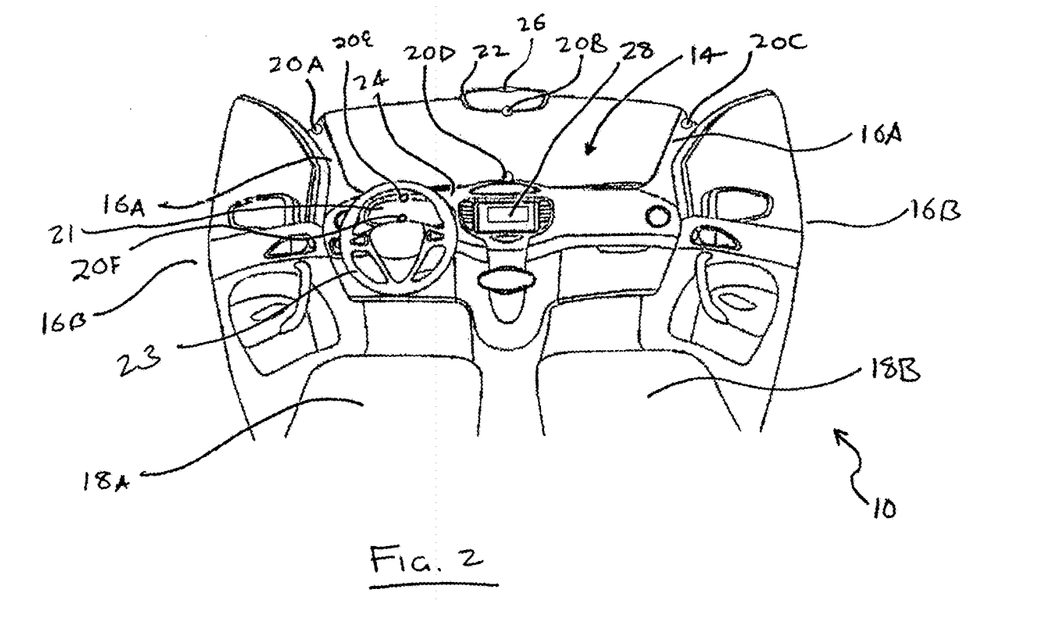
FIG. 2 illustrates a forward looking view of a cabin of the vehicle having a system for calibrating a vision system and/or detecting objects.

Referring to FIG. 2, a cabin 14 of the vehicle 10 is shown. As it is well understood in the art, the cabin 14 is essentially the interior of the vehicle 10 wherein occupants and/or goods are located when the vehicle is in motion. The cabin 14 of the vehicle may be defined by one or more pillars that structurally define the cabin 14. For example, in FIG. 2, A-pillars 16A and B-pillars 16B are shown. FIG. 1 further illustrates that there may be a third pillar or a C-pillar 16C. Of course, it should be understood that the vehicle 10 may contain any one of a number of pillars so as to define the cabin 14. Additionally, it should be understood that the vehicle 10 may be engineered so as to remove these pillars, essentially creating an open-air cabin 14 such as commonly found in automobiles with convertible tops.

Located within the cabin 14 are seats 18A and 18B. The seats 18A and 18B are such that they are configured so as to support an occupant of the vehicle 10. The vehicle 10 may have any number of seats. Furthermore, it should be understood that the vehicle 10 may not have any seats at all.

The vehicle 10 may have one or more cameras 20A-20F located and mounted to the vehicle 10 so as to be able to have a field a view of at least a portion of the cabin 14 that function as part of a vision system. As such, the cameras 20A-20F may have a field of view of the occupants seated in the seats 18A and/or 18B. Here, cameras 20A and 20C are located on the A-pillars 16A. Camera 20B is located on a rearview mirror 22. Camera 20D may be located on a dashboard 24 of the vehicle 10. Camera 20E and 20F may focus on the driver and/or occupant and may be located adjacent to the vehicle cluster 21 or a steering wheel 23, respectively. Of course, it should be understood that any one of a number of different cameras may be utilized. As such, it should be understood that only one camera may be utilized or numerous cameras may be utilized. Furthermore, the cameras 20A-20F may be located and mounted to the vehicle 10 anywhere so long as to have a view of at least a portion of the cabin 14.

The cameras 20A-20F may be any type of camera capable of capturing visual information. This visual information may be information within the visible spectrum, but could also be information outside of the visible spectrum, such as infrared or ultraviolet light. Here, the cameras 20A-20F are infrared cameras capable of capturing images generated by the reflection of infrared light. The source of this infrared light could be a natural source, such as the sun, but could also be an artificial source such as an infrared light source 26. The infrared light source 26 may be mounted anywhere within the cabin 14 of the vehicle 10 so as long as to be able to project infrared light into at least a portion of the cabin 14. Here, the infrared light source 26 is mounted to the rearview mirror 22 but should be understood that the infrared light source 26 may be mounted anywhere within the cabin 14. Additionally, it should be understood that while only one infrared light source 26 is shown, there may be more than one infrared light source located within the cabin 14 of the vehicle 10.

Also located within the cabin 14 may be an output device 28 for relaying information to one or more occupants located within the cabin 14. Here, the output device 28 is shown in a display device so as to convey visual information to one or more occupants located within the cabin 14. However, it should be understood that the output device 28 could be any output device capable of providing information to one or more occupants located within the cabin 14. As such, for example, the output device may be an audio output device that provides audio information to one or more occupants located within the cabin 14 of a vehicle 10. Additionally, should be understood that the output device 28 could be a vehicle subsystem that controls the functionality of the vehicle.

Figure 3:
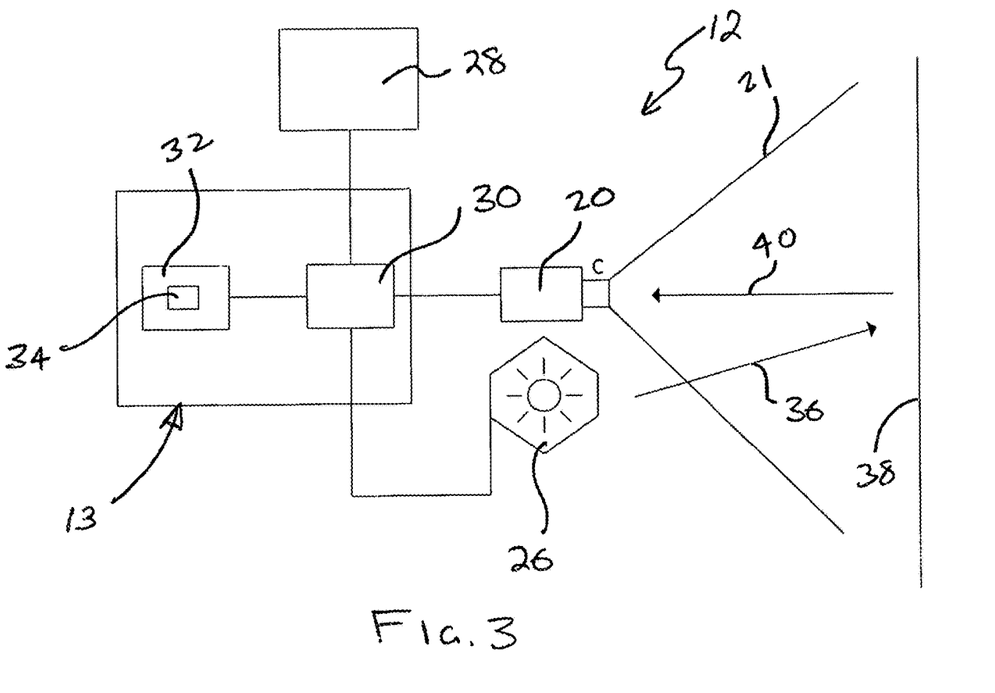
FIG. 3 illustrates a block diagram of the system for calibrating a vision system and/or detecting objects.

Referring to FIG. 3, a more detailed illustration of the system 12 is shown. Here, the system 12 includes a control system 13 that includes a processor 30. The processor 30 may be in communication with a memory 32 that contains instructions 34 for executing any one of a number of different methods disclosed in this specification. The processor 30 may be a single stand-alone processor or may be multiple processors spread across multiple systems working in concert. The memory 32 may be any type of memory capable of storing digital information. As such, the memory may be solid-state memory, magnetic memory, optical memory, and the like. Additionally, it should be understood that the memory 32 may be incorporated within the processor 30 or may be separate from the processor 30 as shown.

The processor 30 may also be in communication with a camera 20. The camera 20 may be the same as cameras 20A-20F shown and described in FIG. 2. The camera 20, like the cameras 20A-20F in FIG. 2, may be an infrared camera. It should also be understood that the camera 20 may be multiple cameras, such as cameras 20A-20F illustrated in FIG. 2. The camera 20 has a field of view 21.

The infrared light source 26 may also be in communication with the processor 30. When activated by the processor 30, the infrared light source 26 projects infrared light 36 to an object 38 which may either absorb or reflect infrared light 40 towards the camera 20 wherein the camera can capture images illustrating the absorbed or reflected infrared light 40. These images may then be provided to the processor 30.

The processor 30 may also be in communication with the output device 28. As stated previously, the output device 28 may be a visual or audible output device capable of providing information to one or more occupants located within the cabin 14 of FIG. 2. Additionally, it should be understood that the output device 28 could be a vehicle system, such as a safety system that may take certain actions based on input received from the processor 30. For example, the processor 30 may instruct the output device 28 to limit or minimize the functions of the vehicle 10 of FIG. 1. As will be explained later in this specification, one of the functions that the system 12 may perform is detecting if an occupant is properly wearing a safety belt. If the safety belt is not properly worn, the processor 30 could instruct the output device 28 to limit the functionality of the vehicle 10, such that the vehicle 10 can only travel at a greatly reduced speed.

Figure 4:
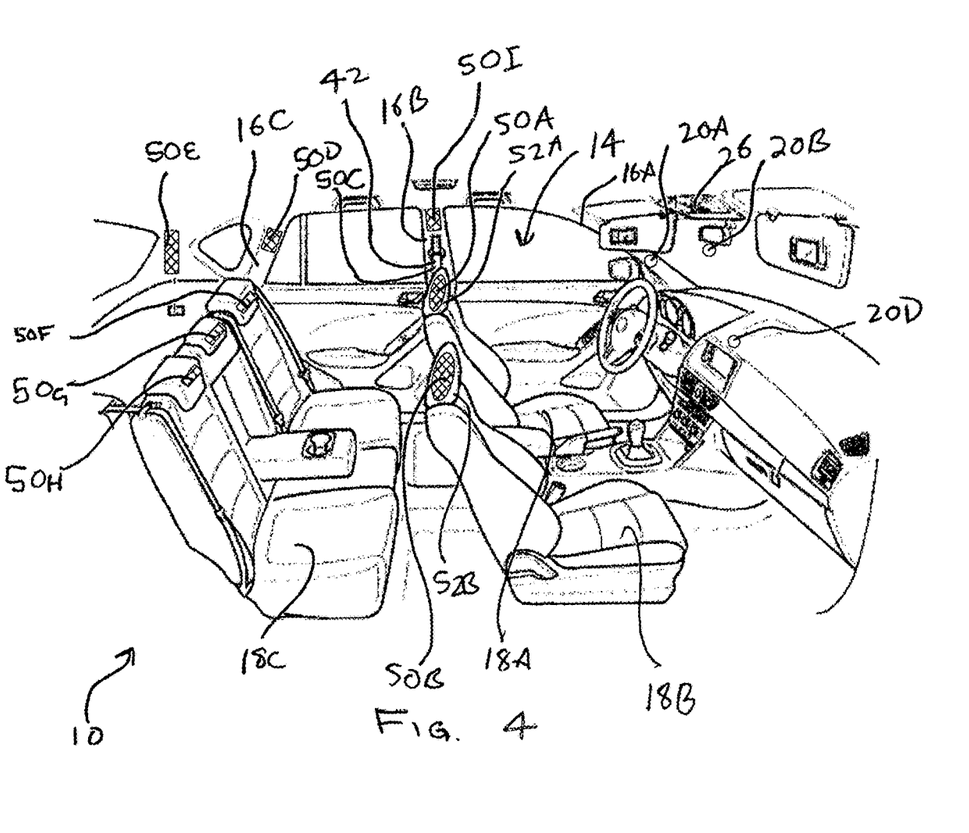
FIG. 4 illustrates a side view of a cabin of the vehicle having a system for calibrating a vision system and/or detecting objects.

Referring to FIG. 4, a side view of the cabin 14 of the vehicle 10 is shown. Like before, the cabin 14 may be defined by A pillar 16A, B-pillar 16B, and C-pillar 16C. Of course, like before, it should be understood that the cabin 14 of the vehicle 10 may include any one of a number of different pillars so as to define the cabin 14. Additionally, it is also possible that the cabin 14 may be defined without the use of pillars. The cabin 14 also includes seats 18A and 18B for supporting the occupants located within the cabin 14 and may also include a rear seat 18C for supporting passengers in the backseat.

Here, different objects located within the cabin 14 of the vehicle 10 have surfaces that have amounts of absorbing and/or reflecting material 50A-50I located thereon. The material 50A-50I may either reflect and/or absorb light. This light that may be reflected and/or absorbed by the material 50A-50I may be infrared light generated by the infrared light source 26. This reflection or absorption of the infrared light may be detected by the cameras 20A-20F located and mounted to the vehicle 10 so as to capture a field of view of the cabin 14.

As stated before, the selective wavelength interactive material 50A-50H may be located in any one of a number of different objects located within the cabin 14 and within the field of view of cameras 20A-20F. The selective wavelength interactive material 50A-50H may be reflecting and/or absorbing material, whereby the material 50A-50H may reflect and/or absorb light at one or more wavelengths, such as infrared. For example, the reflecting and/or absorbing material 50A and 50B may be located on a movable surface of a movable structure, such as the headrest 52A and 52B of the seats 18A and 18B respectively. The headrest 52A and 52B may be movable either independently or with the seats 18A and 18B. Furthermore, it should be understood that the reflective or absorbing material may also be located on the surface of the rear seats 18C, as shown in this example, in the headrest as reflecting or absorbing material 50F, 50G, and 50H.

The reflecting and/or absorbing material may also be located on a fixed structure located within the cabin 14. Here, the reflecting and/or absorbing material may be located on the B-pillar 16B as material 50I. The material may be also located on the C pillar 16C as material 50D. Additionally, the reflecting and/or absorbing material may be located elsewhere in the vehicle as illustrated as 50E. As will be explained later in this specification, the cameras 20A-20F can be calibrated based on the known distance to these fixed structures.

In addition to being located on moveable or fixed structures, the reflecting and/or absorbing material may also be located on a safety belt 42 as material 50C. As such, because of the light reflecting and/or light absorbing properties of the material 50C, the cameras 20A-20F can more clearly see the safety belt 42 and if the occupant located within the cabin 14 is properly utilizing the safety belt 42 as will be described later in this specification.

Referring to FIGS. 5A-5G, a more detailed view of the reflecting and/or absorbing material is shown. The reflecting and/or absorbing material 50, as stated previously, may be disposed on a surface of one or more objects located within the cabin of the vehicle. The reflecting and/or absorbing material may be in the form of a thread that is configured to reflect and/or absorb light, such as infrared light, or may be a paint or ink that may be deposited on a surface so as to reflect and/or absorb light, such as infrared light.

Figure 5A:
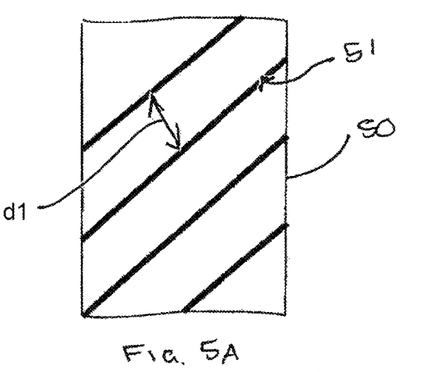
FIGS. 5A-5G illustrate more detailed views of the reflecting and/or absorbing material.
Figure 5B:
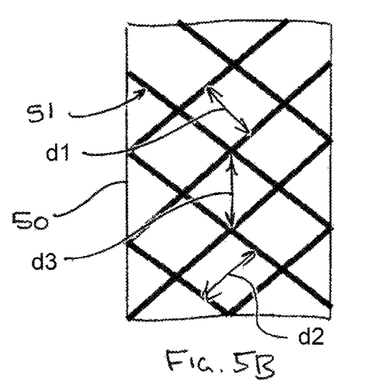

As shown in FIGS. 5A-5G, the reflecting and/or absorbing material 50 may be deposited in the form of a pattern having pattern elements 51. FIG. 5A illustrates the pattern as a plurality of diagonal lines. These diagonal lines are essentially pattern elements that are in a known arrangement spaced apart from one another at a known distance d1 in a first diagonal direction perpendicular to the diagonal lines. FIG. 5B illustrates a crosshatch pattern wherein the pattern elements 51 are spaced apart from each other by known distances d1, d2, d3, where d1 is the first diagonal direction perpendicular to a first set of diagonal lines, d2 is a second diagonal direction perpendicular to a second set of diagonal lines, and d3 is a vertical direction between opposite corners of parallelograms defined by intersections of the first set of diagonal lines and the second set of diagonal lines.

Figure 5C:
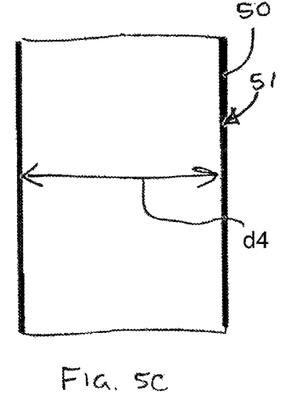
Figure 5D:
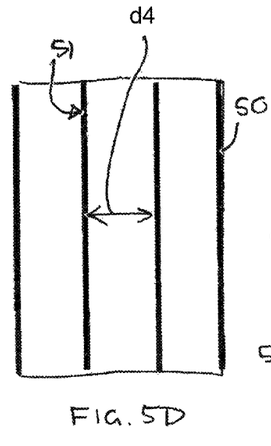

FIGS. 5C and 5D illustrate yet another example of the pattern having pattern elements 51. In FIG. 5C there is shown just two pattern elements 51 separated by a distance d4 in a horizontal direction perpendicular to the pattern elements 51. FIG. 5D shows four separate pattern elements 51 separated by a distance d4 in a horizontal direction perpendicular to adjacent ones of the pattern elements 51. Again, the distance d4 is a known distance and will be useful as will be described later in this specification, so as to calibrate the cameras 20A-20F and/or detect the safety belt 42.

Figure 5E:
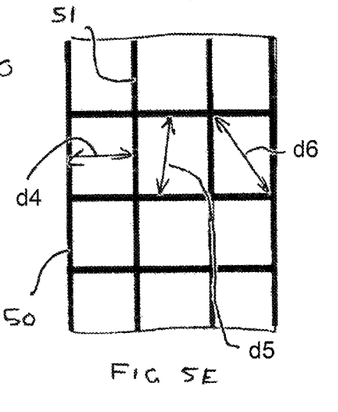
Figure 5F:
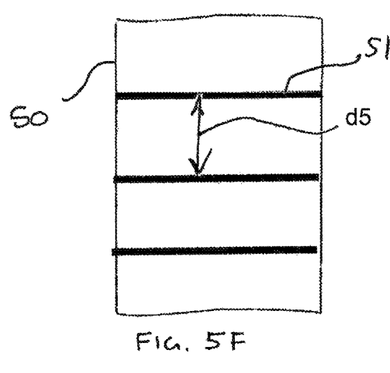
Figure 5G:
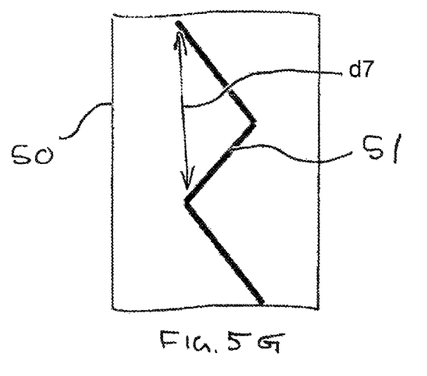

FIG. 5E illustrates a square pattern having a plurality of pattern elements 51 that are separated from each other by known 52 distances d4, d5, d6. These known distances may be horizontal, vertical, or diagonal, as shown. FIG. 5F shows a plurality of pattern elements 51 being in the form of horizontal lines separated by a known distance d5 in a vertical direction perpendicular to adjacent ones of the pattern elements 51. Finally, FIG. 5G illustrates yet another embodiment of the pattern elements 51. In this case, the pattern elements 51 are shown as a zig-zag formation wherein the zig-zag is in a known arrangement and contains dimensions that are separated from each other by a known distance d7 in a vertical direction between alternating vertices of the zig-gag formation (i.e. next adjacent vertices on a line extending along a length of the zig-zag formation).

It should be understood that the pattern elements 51 may be either the reflecting or absorbing portion so as to reflect or absorb light, such as infrared light. It should also be understood that the examples of the patterns shown in FIGS. 5A-5G are merely examples in any one of a number of different patterns or designs may be utilized. Generally, any pattern or design utilized will have a known arrangement wherein different pattern elements are located at a distance from each other by a known distance. Again, this known distance is useful in calibrating the cameras 20A-20F for determining the distance from the one or more cameras 20A-20F to the material 50.

Figure 6:
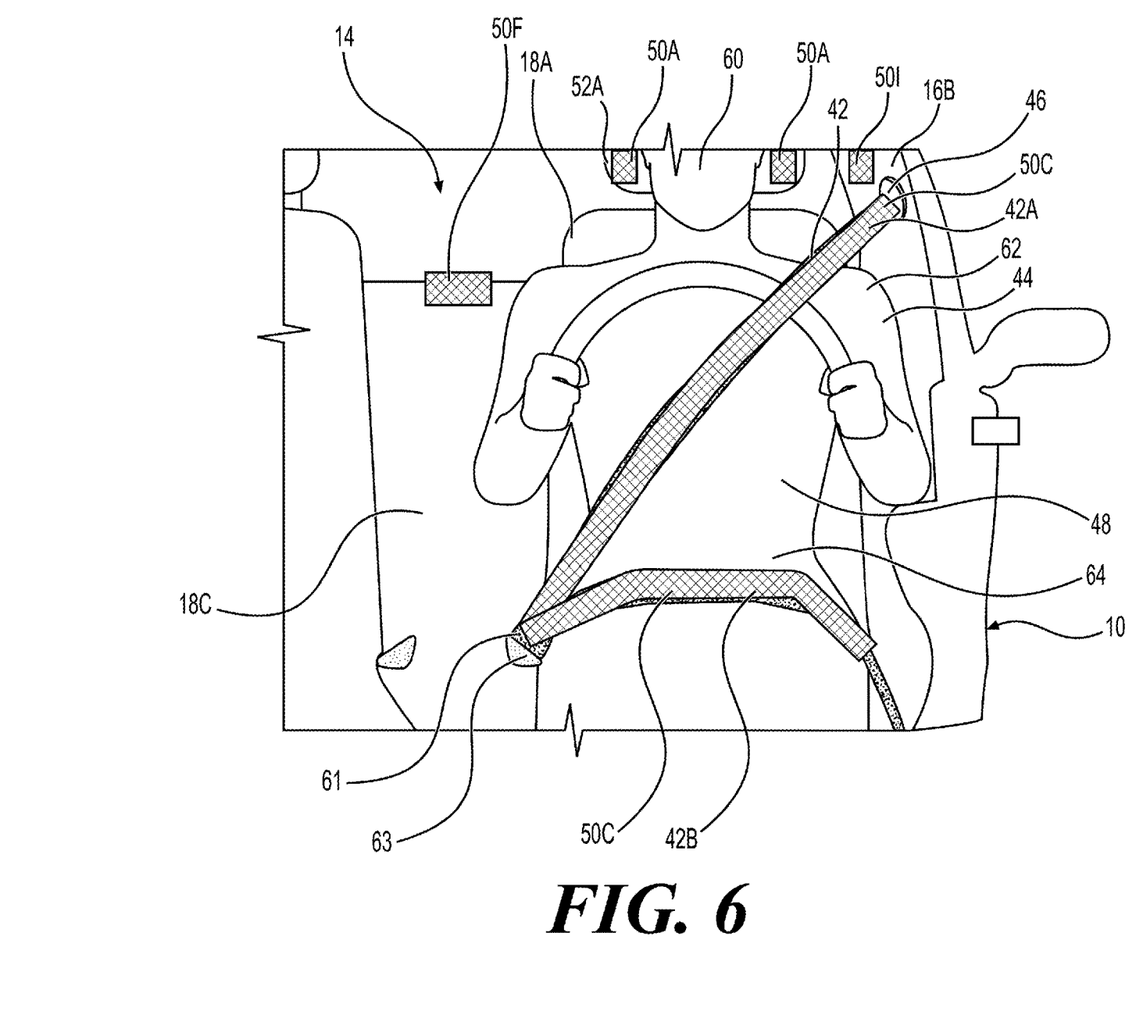
FIG. 6 illustrates a rearward looking view of a portion of a cabin of the vehicle having a system for calibrating a vision system and/or detecting objects.

Referring to FIG. 6, a view of the cabin 14 from the front of the vehicle 10 looking to the rearward of the vehicle 10 is shown. Here, located within the seat 18A is an occupant 44 having a body 48. The body 48 may also include a head 60 and shoulder 62. Here, as can be seen, also shown is the headrest 52A. The material that is capable of reflecting and/or absorbing light, such as infrared light is shown as previously described on several elements, including the safety belt 42, the B-pillar 16B, the headrest 52A and a rear seat 18C. Here, the cameras 20A-20F that have a field of view of the cabin 14 of the vehicle 10 have been configured to see the absorbing and/or reflecting material 50A (disposed on the vehicle headrest 52A), 50I (disposed on the B-pillar 16B), 50F (disposed in the rear seat 18C), and 50C (disposed along the safety belt 42).

As described in FIGS. 5A-5G, it was mentioned that the light reflecting and/or absorbing material 50A-50I may have a pattern with pattern elements in a known arrangement. Furthermore, it was described that these pattern elements may be separated from each other by a known distance d1, d2, d3, d4, d5, d6, and/or d7. Because this distance that separates the pattern elements is known, the cameras 20A-20F can capture images that show the material 50A-50I having the pattern in pattern elements as well as the distances between these pattern elements.

With this in mind, the cameras 20A-20B may be configured to capture the pattern elements from material 50I which, as stated previously, is on a fixed surface of a fixed structure, i.e. the B-pillar 16B. Because the control system 12 has been configured to know the distance between these pattern elements, the control system 12 can utilize the captured image to determine the distance between the pattern elements of the material 50I. Based on the distance in comparison of the distance between the pattern elements in the images captured by the cameras 20A-20F and the known or expected pattern elements, a comparison can be made as to the distance of the cameras to the material 50I. Based on this compared distance, the control system 12 can determine the location of the cameras 20A-20F in relation to the material 50I which is located on a fixed and unmovable structure—the B-pillar 16B.

Moreover, as the distance between the pattern elements increases in the images captured by the one or more camera 20A-20E, this is an indication that one or more of the cameras 20A-20F are closer to the material 50I. Conversely, as the distance between the pattern elements decrease, this is an indication that one or more of the cameras 20A-20F are farther away from the material 50I. By comparing the measured distance from the captured images to an expected or known measured distance, a determination can be made of the positions of the one or more of the cameras 20A-20F in relation to the fixed structure—the B-pillar 16B. This determination of the position of the 20A-20F in relation to the fixed structure—the B-pillar 16B can be used calibrate the cameras.

The system may also be configured to determine if the occupant 44 is properly utilizing the safety belt 42. Here, the cameras 20A-20F may capture images and provide them to the control system 12. The processor 30 of the control system 12 of FIG. 3 may then execute a method for determining if the safety belt 42 is properly located and being properly utilized by the occupant 44.

Here, the control system 12 may determine that portions of the safety belt 42 are located across the body 48 of the occupant 44. This determination may be made based on the safety belt 42 stretching from the shoulder 62 of the occupant and across the body 48 of the occupant 44 or may be determined by portions 42B of the safety belt 42 that stretch across a lap 64 which is part of the body 48 of the occupant 44. Again, what is important is that the control system 12 be able to receive images that indicate that the safety belt is stretching across the body 48 of the occupant in some form.

Additionally, the algorithm executed by the processor 30 may also check to see if a portion of the safety belt 42 is stretching from between a shoulder 62 of the occupant 44 and a webbing guide 46 that functions to guide the webbing of the safety belt 42 from the B-pillar 16B or alternatively, portions of the seat 18A. The algorithm executed by the processor 30 may also be configured so as to detect the head 60 and the shoulder 62 so as to better mark the placement of a portion 42A of the safety belt 42 located between the shoulder 62 and the webbing guide 46.

By executing the algorithm described in this specification, the control system 12 can determine if the occupant 44 is properly wearing their safety belt 42. Of course it is possible that the occupant 44 may not be wearing the safety belt properly, but the system and method improves the confidence that the occupant 44 is properly wearing the safety belt 42.

In addition, as stated previously, the safety belt 42 may have light absorbing and/or reflecting material 50C located on or disposed on the safety belt 42. The cameras 20A-20F can capture images of the material 50C. As stated before, this material 50C may be in a known pattern having pattern elements that are separated from each other by known distances d1, d2, d3, d4, d5, d6, and/or d7. The control system 12 can then review these captured images from the camera 20A-20F and determine if the distance of the safety belt 42 to the camera is generally an expected distance indicating that the safety belt 42 is properly across the body 48 of the occupant 44. In addition, because this pattern is known, clothing that the occupant 44 may be wearing that may reflect and/or absorb light, such as infrared light, can be ignored as it is highly unlikely that the clothing worn by the occupant would have a pattern similar to that of the pattern of the material 50I located on the safety belt 42.

If a determination is made that the occupant 44 is properly wearing the safety belt 42, the control system 12 can allow the vehicle 10 to operate in a normal mode. However, if the control system 12 indicates that the occupant 44 is not properly wearing the safety belt 42, the control system 12 could take any one of a number of different actions. For example, the control system 12 could indicate to the occupant 44 using the output device 28 so as to provide a visual and/or audible cue that the safety belt 42 is not being properly worn. Additionally, the output device 28 could be in communication with any one of a number of different vehicle systems so as to restrict the operation of the vehicle 10 until the safety belt 42 is being properly worn by the occupant 44.

The control system 12 may also be in communication with other control systems so as to improve the reliability of the system. For example, the control system 12 may also be in communication with one or more sensors, such as the sensors that detect the safety belt latch 61 or tongue is inserted into the safety belt buckle 63. If the system 12 determines that the safety belt buckle is properly latched and determines that the safety belt 42 is properly positioned across the body 48 of the occupant 44, the system 12 can with more confidence, determine that the safety belt 42 is being properly utilized by the occupant 44.

In an alternative embodiment, dedicated hardware implementations, such as application specific integrated circuits, programmable logic arrays, and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system for calibrating a camera mounted to a vehicle, the system comprising:
    the camera configured so as to have a field of view of at least a portion of a cabin of the vehicle, the camera configured to capture one or more images of the field of view of at least the portion of the cabin of the vehicle;
    a selective wavelength interactive material located within the cabin of the vehicle and within the field of view, the selective wavelength interactive material shaped as a pattern having pattern elements dimensionally located from one another in a known arrangement;
    a processor in communication with the camera, the processor being configured to receive the one or more images, the one or more images showing reflective or absorbing portions of the pattern having pattern elements; and
    wherein the processor is configured to perform a comparison of a captured arrangement of the pattern having pattern elements from the one or more images to the known arrangement and calibrate the camera based on the comparison of the captured arrangement to the known arrangement;
    wherein the selective wavelength interactive material is located on a fixed surface within the cabin of the vehicle;
    wherein the pattern elements of the pattern are separated from one another by a known distance; and
    wherein calibrating the camera includes determining a position of the camera in relation to the fixed surface within the cabin of the vehicle based on a difference between the known distance and a distance between the pattern elements of the pattern of the selective wavelength interactive material from the one or more images captured by the camera.

2. The system of claim 1, wherein the fixed surface is a pillar of the vehicle.

3. The system of claim 1, wherein the processor is further configured to:
    determine a distance between the pattern elements of the pattern from the one or more images captured by the camera;
    compare the known distance to the distance between the pattern elements of the pattern from the one or more images captured by the camera; and
    calibrate the camera based on a difference between the known distance and the distance between the pattern elements of the pattern from the one or more images captured by the camera.

4. The system of claim 1, wherein the selective wavelength interactive material is located on a movable surface within the cabin of the vehicle.

5. The system of claim 4, wherein the processor is further configured to:
    determine a distance between the pattern elements of the pattern from the one or more images captured by the camera;
    compare the known distance to the distance between the pattern elements of the pattern from the one or more images captured by the camera; and
    determine a location of the movable surface relative to the camera based on a difference between the known distance and the distance between the pattern elements of the pattern from the one or more images captured by the camera.

6. The system of claim 5, wherein the movable surface is a seat or headrest of the seat located within the cabin of the vehicle.

7. The system of claim 1, wherein the camera includes at least one infrared camera.

8. The system of claim 1, wherein the selective wavelength interactive material is a reflective or absorbing material configured to reflect or absorb light.

9. A system determining when an occupant seated in a seat is wearing a safety belt associated with the seat, the system comprising:
    a camera mounted and configured to have a field of view of the occupant seated in the seat, the camera configured to capture one or more images of the field of view of the occupant seated in the seat;
    a first amount of selective wavelength interactive material disposed on a surface of the safety belt, the first amount of selective wavelength interactive material configured to reflect or absorb infrared light from an infrared light source;
    a processor in communication with the camera, the processor being configured to receive the one or more images, the one or more images showing reflective or absorbing portions of the first amount of selective wavelength interactive material on the surface of the safety belt;
    wherein the processor is configured to determine that the occupant seated in the seat is wearing a safety belt associated with the seat when the one or more images show reflective or absorbing portions of the first amount of the selective wavelength interactive material on the surface of the safety belt extending across the occupant seated in the seat;
    a second amount of the selective wavelength interactive material located on a surface and shaped as a pattern having pattern elements dimensionally located from one another in a known arrangement;
    wherein the second amount of the selective wavelength interactive material is located on a fixed surface;
    wherein the pattern elements of the pattern of the second amount of the selective wavelength interactive material are separated from one another by a known distance; and
    wherein the processor is further configured to:
        determine a distance between the pattern elements of the pattern of the second amount of the selective wavelength interactive material from the one or more images captured by the camera;
        compare the known distance to the distance between the pattern elements of the pattern of the second amount of the selective wavelength interactive material from the one or more images captured by the camera; and
        determine a position of the camera in relation to the fixed surface based on a difference between the known distance and the distance between the pattern elements of the pattern of the second amount of the selective wavelength interactive material from the one or more images captured by the camera.

10. The system of claim 9, wherein the processor is configured to determine that the occupant is seated in the seat when the one or more images show a head of the occupant or head and shoulders of the occupant located in a position adjacent to the seat.

11. The system of claim 9, wherein the processor is configured to determine that the occupant seated in the seat is wearing a safety belt associated with the seat when the one or more images show reflective or absorbing portions of the first amount of the selective wavelength interactive material on the surface of the safety belt extending between a shoulder of the occupant and a webbing guide of the safety belt.

12. The system of claim 9, wherein the first amount of selective wavelength interactive material is shaped as a pattern having pattern elements, the pattern elements are dimensionally located from one another in a known arrangement.

13. The system of claim 12, wherein the processor is further configured to determine that the occupant seated in the seat is wearing a safety belt associated with the seat when the one or more images show the pattern of the first amount of the selective wavelength interactive material on the surface of the safety belt extending across the occupant seated in the seat.

14. The system of claim 9, wherein the fixed surface is a pillar located within a cabin of a vehicle.

15. The system of claim 9, wherein the second amount of selective wavelength interactive material is located on a movable surface within a cabin of a vehicle.

16. The system of claim 15, wherein the processor is further configured to:
determine a distance between the pattern elements of the pattern of the second amount of the selective wavelength interactive material from the one or more images captured by the camera;
compare the known distance to the distance between the pattern elements of the pattern of the second amount of the selective wavelength interactive material from the one or more images captured by the camera; and
determine a location of the movable surface relative to the camera based on a difference between the known distance and the distance between the pattern elements of the pattern of the second amount of the selective wavelength interactive material from the one or more images captured by the camera.

17. The system of claim 15, wherein the movable surface is the seat or headrest located within the cabin of the vehicle.

18. The system of claim 9, wherein the camera includes at least one infrared camera.

19. The system of claim 9, wherein the selective wavelength interactive material is a reflective or absorbing material configured to reflect or absorb light.

20. The system of claim 1, wherein the pattern elements include two sets of parallel lines, with the two sets of parallel lines intersecting to define parallelogram-shaped regions; and
wherein the known distance is defined by a distance between opposite corners of the parallelogram-shaped regions.

21. The system of claim 1, wherein the pattern elements include a zig-zag formation.

22. The system of claim 21, wherein the known distance is defined by alternating vertices of the zig-zag formation.

23. The system of claim 1, wherein the pattern elements include two sets of parallel lines, with the two sets of parallel lines intersecting to define rhombus-shaped regions.

24. The system of claim 23, wherein the known distance is defined by a distance between opposite corners of the rhombus-shaped regions.

25. The system of claim 1, wherein the pattern elements include two sets of parallel lines intersecting at right angles to define rectangular-shaped regions; and
wherein the known distance is defined by one of a height, a width, or a diagonal distance across the rectangular-shaped regions.

* * * * *